United States Patent [19]
Gerke et al.

[11] 4,388,718
[45] Jun. 14, 1983

[54] DIGITAL TELECOMMUNICATION SYSTEM

[75] Inventors: Peter Gerke, Graefelfing; Joachim Petersen, Munich, both of Fed. Rep. of Germany

[73] Assignee: Siemens Aktiengesellschaft, Berlin & Munich, Fed. Rep. of Germany

[21] Appl. No.: 228,675

[22] Filed: Jan. 26, 1981

[30] Foreign Application Priority Data

Jan. 30, 1980 [DE] Fed. Rep. of Germany ....... 3003290

[51] Int. Cl.$^3$ ........................ H04J 3/00; H04Q 11/04
[52] U.S. Cl. ............................... 370/110.1; 179/2 DP
[58] Field of Search ........................ 179/2 DP, 2 TV; 370/110.1

[56] References Cited

U.S. PATENT DOCUMENTS 3,790,715  2/1974  Inose et al. ........................ 370/110.1
3,997,728  12/1976  Duquesne et al. ............... 370/110.1
4,045,617  8/1977  Schlichte ............................ 370/65

OTHER PUBLICATIONS

P. Gerke et al., International Switching Symposium, Paris, May 1979, pp. 773-780.
W. Graf, "Multiplex Equipment DSMX64K/2 and Insertion Unit DSE64K/2 for Digital Transmission", Telecom Report 2(1979), pp. 46-51.
P. Gerke, "Interaction between Circuit Technology and System Concepts in the Field of Digital TDM Switching", IEEE Proc. 1976 International Zurich Seminar on Digital Communications, pp. c1.1-1.8 and c3.1-3.6.
P. Hirschmann, "Design Concept and Features of Digital Subscriber Sets, " IEEE Proc. 1978 International, Zurich Seminar on Digital Communications, pp. d1.1-1.4, d2.1-2.4, d3.1-3.4 and d4.1-4.6.
J. Beesley, "Foundations of System IFS-1," ISS 1972, C72 CHO 617-1-COM), IEEE Conf. Rec., pp. 55-64 and 65-72.
H. Geissler, "Contribution to Planning Pulse Code Modulation Systems (PCM) in Postal Communication Networks", NTZ, 1967, No. 11, pp. 667-682.
P. Gerke, "A Few Points of View Concerning Integrated Services Digital Communication Networks", Telefon Report, 11, 1975, No. 3, pp. 86-90.

Primary Examiner—Thomas A. Robinson
Attorney, Agent, or Firm—Hill, Van Santen, Steadman, Chiara & Simpson

[57] ABSTRACT

A digital telecommunication system has a plurality of 64 kbit/s channels subdivided into respective 56 kbit/s primary channels and 8 kbit/s auxiliary channels. Continuously from subscriber-to-subscriber, the 56 kbit/s primary channels serve respectively alternately for the transmission of pulse code modulated or delta modulated speech signals and/or rapid fixed image transmission or rapid data transmission, whereas the 8 kbit/s auxiliary channels are only available for the transmission or exchange-oriented signaling characters, slow fixed image transmission, slow data transmission from subscriber-to-subscriber, as well as for transmission of subscriber-to-subscriber control information and/or remote control and similar special service information. In the switching centers, the 8 kbit/s auxiliary channels of all subscribers of an appertaining switching center are constantly read and signaling characters and special service information are mixed in or mixed out by the switching center in accordance with the service information signals attached to the information transmitted in the 8 kbit/s auxiliary channels.

1 Claim, 5 Drawing Figures

DIGITAL TELECOMMUNICATION SYSTEM

BACKGROUND OF THE INVENTION

Recent developments in telecommunications engineering have led to digital telecommunication systems which provide a conversion of speech signals into digital signals in a subscriber station for telephone subscribers and in which a digital telephone connection by way of a standard digital communication channel with a bit rate of 64 kbits/s (per transmission direction) can be completed between the subscriber station and the switching station, the subscriber station being directly connected to the digital telephone connection and, moreover, a signaling connection for outslot signaling with a bit rate of, for example, 8 kbit/s (per transmission direction) can permanently exist outslot of the 64 kbit/s communication channel, whereby, in addition to outslot signaling, inslot signaling can also be provided within the message channel (ISS'79, pp. 773–780). In addition to speech, texts, data and images can be transmitted in the 64 kbit/s channels of such a digital telecommunication system.

In such digital telecommunication systems, there is the possibility that specific subscriber locations, in terms of exchange orientation, do not belong to that switching center to which the appertaining subscriber station is directly connected but, rather, to a different switching center —via a permanently through-connected connection extending by way of the switching center. Such a network configuration can be provided, for example, in a services-integrated digital telecommunication system in which data subscriber stations are only indirectly connected to an appertaining data switching center via permanently through-connected connections extending through telephone switching centers (telefon-report 11 (1975), 3, 86–90), or also in the case of an outside (PBX) extension whose switching center is connected via a leased channel extending via the public telecommunication network.

Such a connection, which is only indirect, of a subscriber station to the appertaining switching center can lead to the fact that only the standard, actual message channel with a bit rate of 64 kbit/s is available on a part of the overall connection path, but not an additional signaling channel as well, so that identical communication possibilities and signaling operations and corresponding interface conditions are not possible, at least without further considerations for directly-connected and for indirectly-connected subscriber stations. However, identical communication possibilities, signaling operations and interface conditions will be required, particularly given subscriber stations which are otherwise identical.

SUMMARY OF THE INVENTION

The present invention provides a way to do justice to such conditions and to make possible uniform communications possibilities, signaling procedures and interface conditions in a telecommunications system having 64 kbit/s standard channels.

The invention relates to a digital telecommunication system having 64 kbit/s standard channels respectively subdivided into a 56 kbit/s primary channel and an 8 kbit/s auxiliary channel. The digital telecommunication system is characterized in that continuously, on the subscriber lines, in the switching centers and on the transmission paths lying inbetween, only the 56 kbit/s primary channels respectively serve transmission of pulse code (PC) modulation or $\Delta$ modulated speech signals and/or rapid fixed image transmission or rapid data transmission from subscriber-to-subscriber and the 8 kbit/s auxiliary channels are respectively available only for the transmission of exchange-oriented signaling characters as well as a slow fixed image transmission or, respectively, slow data transmission from subscriber-to-subscriber, as well as for the the transmission of subscriber-to-subscriber control information ad/or remote control or similar special service information telemetry, whereby the 8 kbit/s auxiliary channels of all subscribers of the appertaining switching center are constantly read in the subscriber switching centers and signaling characters and special service information from the switching center are mixed in (insert) or, respectively mixed out (extract) in accordance with the service indication signals attached to the information transmitted in the 8 kbit/s auxiliary channels.

In addition to the advantage of a reduced bit rate load of the subscriber lines, the invention offers the further advantage that all subscribers of the telecommunications system can make use of the communication possibilities of one or, respectively, both partial channels in an identical uniform manner independently of exchange-oriented associations which may differ, whereby subscriber stations for only one type of communication, for example telephony, and subscriber stations for a plurality of types of communications, for example, particularly slow fixed image transmission (telecopying, individual image transmission) in addition to telephony, can coincide in their interface conditions or, respectively, uniform subscriber stations can optionally be operated in one type of communication or in mixed communications. It is further advantageous that multiplexing of individual subscriber channels is possible without additional expense for the signaling characters and the further type of communication realized in the 8 kbit/s channel and that the dial keyboard of a subscriber station can be exploited in a simple manner for data, for example for order operations, to be slowly transmitted from subscriber-to-subscriber.

It should be pointed out here that it is known in the art (for example from NTZ 20 (1967) 11, pp. 667–682) that, given a PCM transmission system with 64 kbit/s telephone channels, respectively 7 bits of each PCM word can serve for speech signal coding and 1 bit can serve as a signaling pulse. Problems of exchange-oriented association of subscriber locations and their communication possibilities, particularly of mixed and special service communications, are thereby not taken into consideration.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
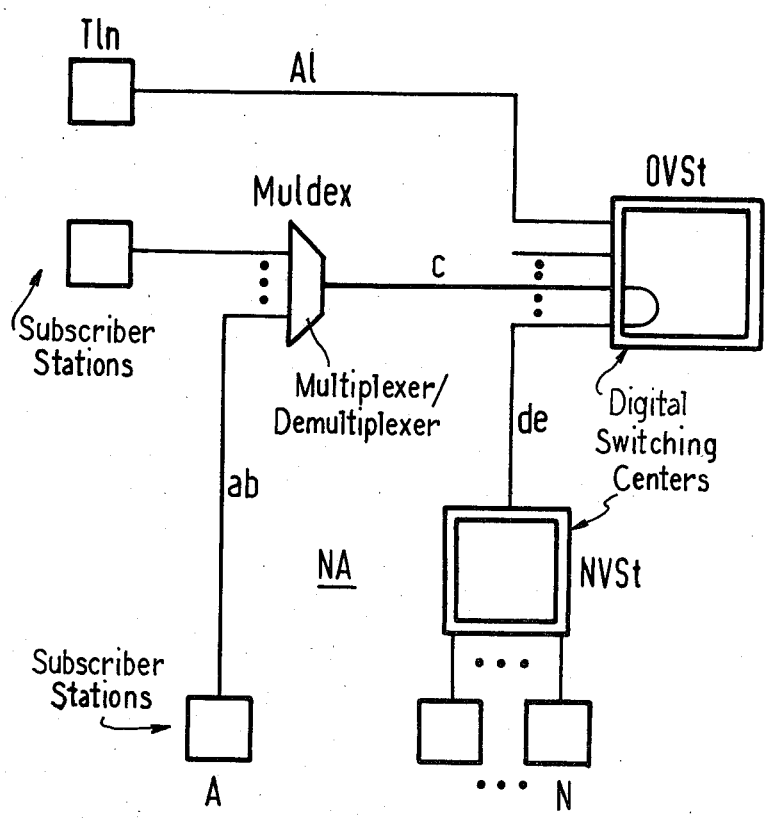
FIG. 1 is a schematic block diagram of an exemplary embodiment of a digital telecommunications system constructed in accordance with the present invention.

Schematically illustrated in FIG. 1 of the drawing, in a scope necessary for an understanding of the invention, is a digital telecommunication system having a digital switching center OVSt, to which appertaining subscriber stations are directly connected by way of a multiplexer/demultiplexer Muldex with an adjacent time-division multiplex line c or, as the subscriber station Tln, are directly connected via their subscriber lines Al. The digital switching center OVSt, the multiplex lines c, the multiplexer/demultiplexer Muldex, the subscriber line Al and the subscriber station Tln can, for example, be a matter of a section of a public digital telephone network for speech, and under certain conditions, for data, text and/or image communication as well. A subscriber station A is connected to a further input/output of the multiplexer/demultiplexer Muldex via a subscriber line ab, the subscriber station A being assumed to belong to a different switching center NVSt connected, in turn, to the digital switching center OVSt, belonging, for example, to the switching center of a digital telephone extension system NA having a plurality of subscriber stations A–N, but being only indirectly connected to the switching center NVSt, namely by way of a multiplex line c and a connection in the digital switching center OVSt, which is permanently—or, under certain conditions, only case-by-case—through-connected, as illustrated in FIG. 1. Digital subscriber stations are basically known in the art (for example from the IEEE Proceedings 1978 INTERNATIONAL ZURICH SEMINAR ON DIGITAL COMMUNICATIONS, Pages D1.$\frac{1}{4}$ (FIG. 11), Pages 2.$\frac{1}{4}$ (FIG. 8), Pages D3.$\frac{1}{4}$ (FIG. 1) and Pages D4.1/6 (FIG. 2)) for which reason a more detailed description is not necessary herein. Also, digital switching centers are generally known in the art (for example from U.S. Pat. No. 4,045,617, which is fully incorporated herein by this reference, from the IEEE Conference Record ISS72, pp. 55–64 (FIG. 1), and Pages 65–72 (FIG. 1), or from the IEEE Proceedings 1976 INTERNATIONAL ZURICH SEMINAR ON DIGITAL COMMUNICATIONS, Pages C1.$\frac{1}{8}$ and Pages C3.1/6), for which reason one can likewise forego a more detailed explanation herein. The analogous case also applies to multiplexers/demultiplexers which are likewise well known in the art.

Figure 2:
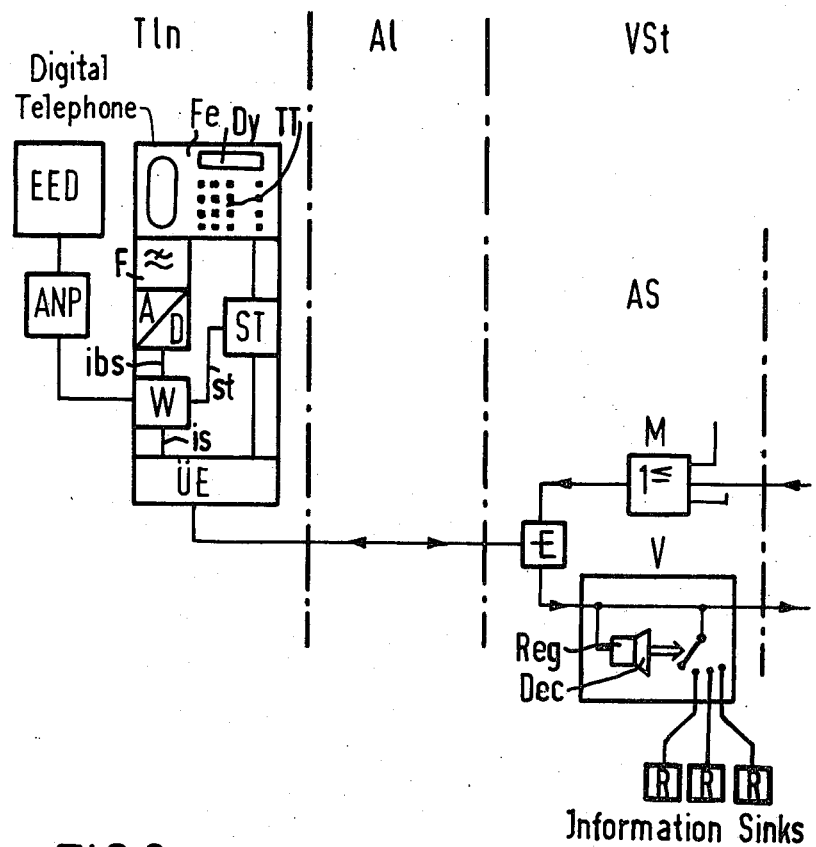
FIG. 2 illustrates circuit details of a portion of the apparatus of FIG. 1.

In the left-hand portion, FIG. 2 schematically illustrates an exemplary embodiment of a subscriber station Tln while emphasizing details which are of interest herein. As can be seen from FIG. 2, the subscriber station Tln may comprise a digital remote telephone Fe having a keyboard TT, a display Dy, a filter F, an analog/digital converter A/D, a transmitting unit UE for transmitting and receiving given separation of transmission direction as well as the clock supply and synchronization and a control unit ST sequencing the signaling character exchange with a switching center, whereby the latter, in particular, can also be realized in microprocessor technology. In addition, the subscriber station, however, can also comprise a terminal device EED for other services, such as, for example, slow fixed image transmission, which is connected via an adaptor circuit ANP to a switching circuit W provided at the digital telephone Fe and, if necessary, controlled by way of the control unit ST via a line st. The switching circuit W, as shall be described in greater detail with respect to FIG. 4, can, for example, comprise a partial channel multiplexer/demultiplexer which groups the telephone digital signals coming from a digital telephone Fe and the telecopier digital signals coming from the terminal device EED provided, for example, by a Hell telecopier HF1048, into a common bit stream flowing in the outgoing 64 kbit/s channel, telephone signal bits and telecopier signal bits respectively occurring within its frames at respectively predetermined locations or, respectively, in the reverse transmission direction, redistributing the telephone signal bits and telecopier signal bits contained in the incoming bit stream to the telephone Fe and to the terminal device EED which is provided, in this example, by a telecopier.

It should be pointed out that, under certain conditions, a plurality of such terminal devices (EED) can likewise be provided for various services at a subscriber station or that a subscriber station, under certain conditions, can comprise only the terminal devices for other services, but not a digital telephone as well. Moreover, it should also be pointed out that other subscriber locations of the digital telecommunication system according to FIG. 1, for example the subscriber station A, can be designed in an analogous manner.

Figure 4:
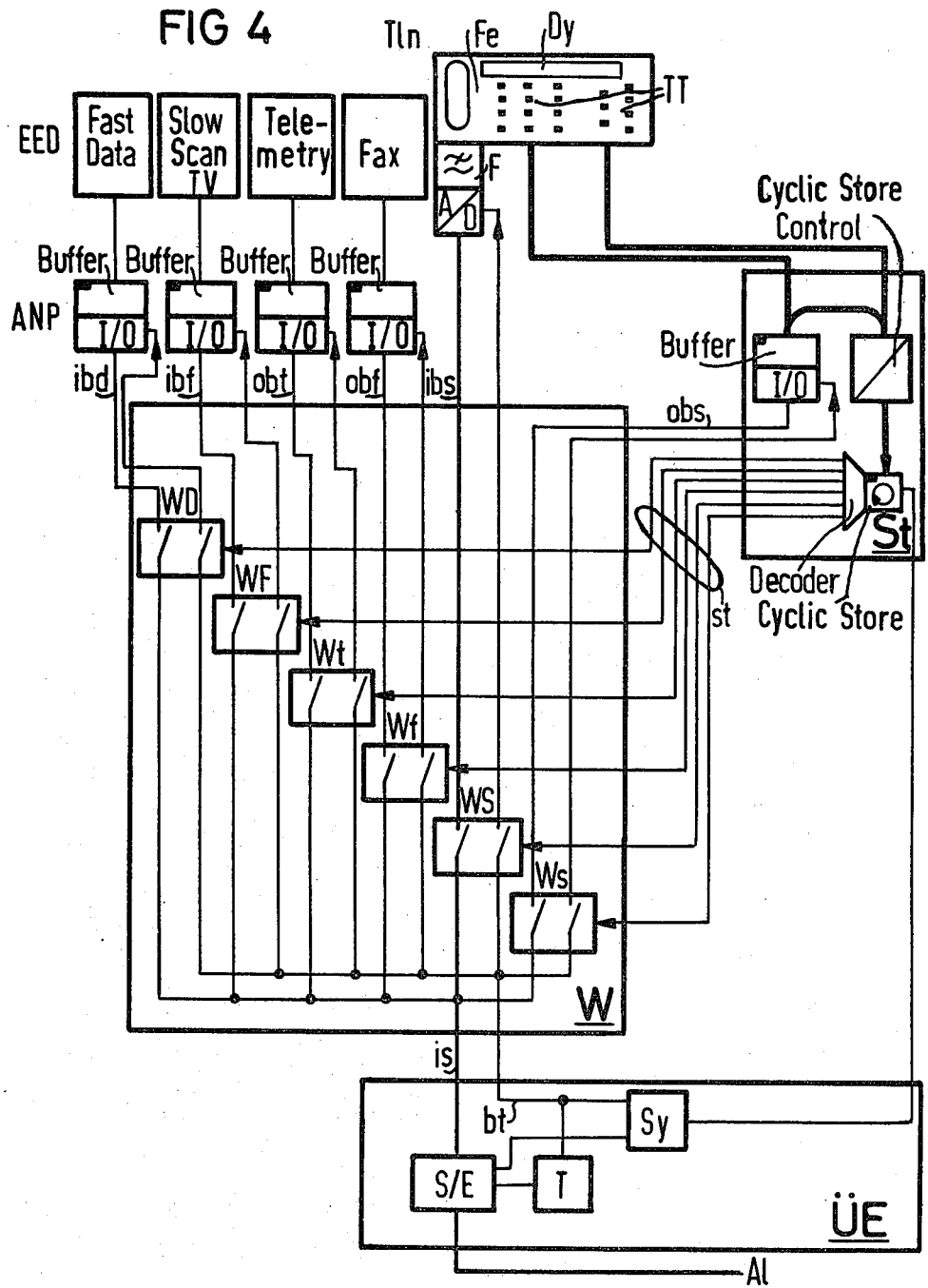
FIG. 4 is a detail circuit diagram of switching control with respect to a plurality of communication devices at a subscriber station.

FIG. 4, which like FIGS. 1 and 2 has been kept to single-lead illustration, shows a corresponding exemplary embodiment of a subscriber station Tln in further detail. First, assume that the subscriber station Tln (in accordance with the illustration of FIG. 2) again has a digital telephone Fe with a keyboard TT, a display Dy, a filter F, an analog/digital converter A/D, a transmitting unit UE, a control unit ST and a switching circuit W. In addition, a terminal device for rapid data transmission (fast data) a terminal device for rapid fixed image transmission (slow scan TV), a terminal device for special service communication (telemetry), and a terminal device for slow telecopying (Fax) are provided as terminal devices EED for other communication services, the terminal devices being respectively connected to the switching circuit W by way of adaptor circuits ANP including buffers and input/output devices (I/O). The switching circuit W according to FIG. 4 comprises switches WD, WF, Wt, Wf, WS and Ws, by way of which, on the one hand, the 64 kbit/s line connection is extending between the switching circuit W and the transmitting/receiving unit S/E of the transmitting unit UE can be connected to the input/output lines ibd, ibf, obt, obf, ibs of the adaptor circuits ANP belonging to the terminal devices EED or, respectively, of the analog/digital converter A/D, as well as to a corresponding input/output line obs of an input/output device I/O contained in the control unit ST and serving for the transmission of the signaling characters or, respectively, control information. On the other hand, a clock line bt of a clock circuit T of the transmitting unit UE can be connected via the switches WD, WF, Wt, Wf, WS, Ws to corresponding clock control inputs of the input/output devices I/O.

In the exemplary embodiment according to FIG. 4, the switches WD, WF, Wt, Wf, WS, Ws can be driven by the control unit ST via control lines st, to which end the control unit ST may comprise a drive decoder connected to an output of an address memory (cyclic memory) emitting corresponding drive addresses, the outputs of the drive decoder extending to the control inputs of the switches WD, WF, Wt, Wf, WS, Ws. To that end, it is indicated in FIG. 4 that the actuation of the control keys provided at the keyboard TT of the digital telephone Fe to be actuated depending upon the desired exploitation of communication services effects the inputs of corresponding drive addresses into the address memory, in particular via an address memory control, cyclic store control, in which the switch address to be inscribed at the individual memory locations of the address memory cyclic store may be stored tabularly for each combination of communication services respectively to be used. At its respective address memory locations, the address memory connected to a synchronization device Sy of the transmitting unit UE thereby contains a combination of switch addresses of the switches to be respectively actuated for the respective combination of currently-employed communication services in the actuation sequence determined by the bit rate and position of the 56 kbit/s primary channel and the 8 kbit/s auxiliary channel, so that the switches are driven in the corresponding sequence. Thereby, in the normal condition, assume at least the switch Ws to be respectively alternately closed for a 1 bit transmission time interval and opened for a 7 bit transmission time interval and, under certain conditions, assume the switch WS to be respectively alternately closed for the 7 bit transmission time interval and opened for the 1 bit transmission time interval, so that the 8 kbit/s auxiliary channel can be utilized for a transmission of switching oriented signaling characters and, under certain conditions, the 56 kbit/s primary channel is ready for telephone communication.

Figure 3:
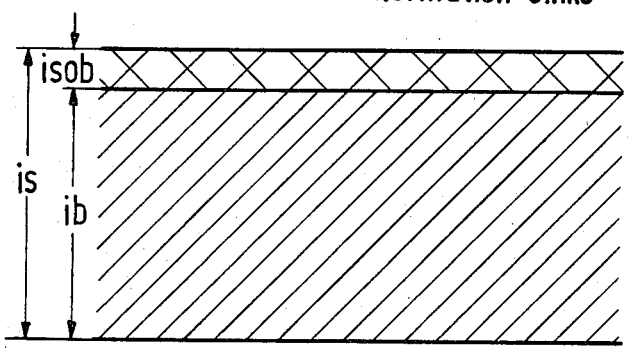
FIG. 3 is a graphic illustration of the position and seizure of primary and auxiliary channels.

Assume the telecommunication channels on the subscriber lines Al, . . . ab, . . . de, on the multiplex path c and, likewise, on the transmission paths which may connect the digital switching center OVSt to other switching centers (not illustrated in greater detail in FIG. 1), the channels having a bit rate of respectively 64 kbit/s (per transmission direction), available for the message transmission from and to all subscriber locations Tln, . . . , A connected to the digital switching center OVSt of the digital telecommunication system according to FIG. 1, whereby, as indicated in FIG. 3, each 64 kbit/s channel is is subdivided into a 56 kbit/s primary channel ib and an 8 kbit/s auxiliary channel isob.

Continuously on the subscriber line paths, as well as on the subscriber line Al of the subscriber station Tln (FIGS. 1 and 2) or on the subscriber lines ab of the subscriber station A, including the following multiplex paths c (FIG. 1) and a connection line de (FIG. 1), in the switching centers, such as in the digital switching center OVSt (FIG. 1), and on the transmission paths lying between such switching centers, only the 56 kbit/s primary channels respectively serve for the transmission of PC modulated, or, given higher speech quality, Δ modulated speech signals and/or for rapid fixed image transmission or rapid data transmission from subscriber-to-subscriber, to which end the subscriber stations Tln . . . or, respectively, A . . . N may be designed in general for such operation.

The 8 kbit/s auxiliary channels isob (FIG. 3) lying in slot of the 64 kbit/s channels, but outband of the 56 kbit/s primary channels, in contrast thereto, are not loaded by the telecommunication services sequenced in the 56 kbit/s primary channels ib (FIG. 3). The 8 kbit/s in slot-outband auxiliary channels isob (FIG. 3), on the contrary, serve exclusively other purposes, namely the transmission of the exchange-oriented signaling characters controlling the completion of connection and disconnection, the transmission being between subscriber stations and switching centers (and vice-versa), as well as a slow fixed image transmission, such as telecopying or individual image transmission, rendered possible with the assistance of a corresponding terminal device EED or, respectively, a slow data transmission from subscriber-to-subscriber effected, for example, with the assistance of the keyboard TT and/or the transmission of subscriber-to-subscriber control information for end-to-end signaling procedures as are required, for example, in mixed communication for a change of the type of communication (for example in switching from telephone to data transmission or fixed image transmission) or, respectively, of remote control and other special service information (telemetry). Such special service information, for service information, for example, can be a matter of remote control commands to be transmitted to the subscriber, for example for switching electrical devices on or off, or can be a matter of interrogation commands, for example, for interrogating a counter reading, or, in a reverse transmission direction, can be a matter of counter reading information or emergency calls.

To this end, and again referring to FIG. 4, to which end it is assumed that the subscriber station Tln illustrated is connected via a subscriber line Al to a remote location (not illustrated on the drawing) and that, within the framework of the connection, simultaneously with a telephone communication occurring in the 56 kbit/s primary channel and for its promotion, a slow data transmission or control information transmission from subscriber-to-subscriber effected with the assistance of the keyboard TT or, respectively, display Dy may occur in the 8 kbit/s auxiliary channel. To this end, the switch address combination already inscribed in the address memory Cyclic Store for the connection completion connected with a signaling character transmission in the 8 kbit/s auxiliary channel is retained in the address memory and, accordingly, the switch WS (say, for the successive transmission of 7 bit PCM speech signal words) is respectively alternately closed for a 7 bit transmission time interval and opened for a 1 bit transmission time interval in the sequence of the cyclically repeated read-out of the addresses from the address memory Cyclic Store and the drive of the corresponding switch effected by the decoder, whereas, inversely, the switch Ws is respectively closed for the 1 bit transmission interval (for the successive transmission of the individual data or, respectively, control information bits) and is opened for the 7 bit transmission time interval. If, instead of such a combination (or even in addition thereto) facsimile transmission or remote control or other special service communication (telemetry), for example, occurs in the 8 kbit/s auxiliary channel, then, in response to a corresponding control key actuation —or a is indicated in FIG. 4 by a connection extending from the buffer to the cyclic store control, in response to the receipt of a corresponding end-to-end control signal —such a switch address combination is written into the address memory that, in the sequence of the cyclically repeated read-out of the addresses and the drive of the corresponding switches, the switch Wf, or, respectively, Wt is closed for the 1 bit transmission time interval instead of the switch Ws (or, alternating with such switch as well). If, instead of a telephone communication, rapid data transmission or rapid fixed image transmission is to occur in the 56 Kbit/s primary channel, then, in response to a corresponding control key actuation, such a switch address combination is inscribed in the address memory Cyclic Store that, in the sequence of the cyclically repeated read-out of the addresses and the drive of the corresponding switches, the switch WD or, respectively a switch WF is actuated instead of the switch WS. By a corresponding switch actuation, it is also possible to use the 56 kbit/s primary channel both for the telephone communication in a 32 kbit/s partial channel then carrying corresponding $\Delta M$ speech signals and for rapid data transmission in the remaining 24 kbit/s partial channel, when the analog/digital converter A/D of the digital telephone Fe is designed as a $\Delta$modulator-demodulator or, without being illustrated in FIG. 4, at least can be switched to such operation.

Service indication signals generated, for example, by the dial keyboard TT, can precede the information transmitted in the 8 kbit/s auxiliary channels isob (FIG. 3) or can be attached thereto in some other manner. In the subscriber switching centers, the 8 kbit/s auxiliary channels of all subscribers of the appertaining switching center are constantly read, regardless of whether the appertaining subscriber is now participating in a connection or not. Thereby, the switching center mixes exchange-oriented signaling characters (dial information) and special service information in or out in accordance with the attached service indication signals.

To this end, it is indicated in FIG. 2 that a distributor circuit V can be provided at the receiving side in the switching center OVSt in the connection circuit AS individually assigned to a subscriber line Al, the distributor circuit V accepting, via a memory register Reg, with a following decoder Dec, such service indication signals and respectively setting a distributor in accordance with the accepted service indication signals, by way of which distributor the respectively appertaining signaling characters or, respectively, special service information can be mixed out toward an appertaining information receiver (Information Sink)/R (schematically illustrated in FIG. 2). Moreover, it is also indicated in FIG. 2 that a mixer circuit M containing an OR circuit is provided at the transmission side in the connection circuit AS, the mixer circuit M mixing the special service information and signaling characters deriving from various data sources and to be transmitted in the 8 kbit/s auxiliary channel via the connection line Al to the subscriber location Tln together with subscriber-to-subscriber control information likewise transmitted in the 8 kbit/s auxiliary channel to the subscriber location Tln and slow data transmitted from subscriber-to-subscriber.

Figure 5:
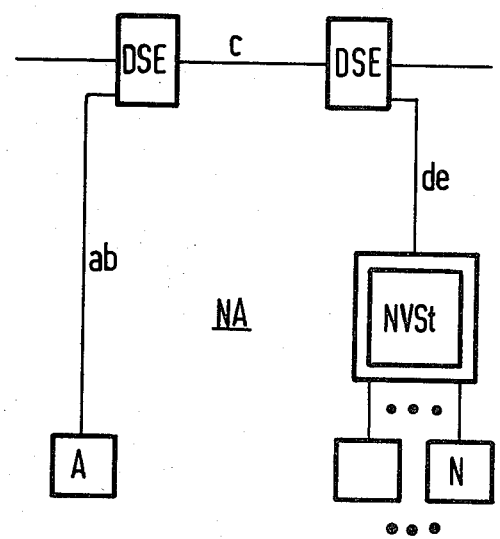
FIG. 5, similar to FIG. 1, is a block diagram illustration of an embodiment of the invention.

In summary, it should also be pointed out that, deviating from the conditions illustrated in FIG. 1, it is also possible that, as is indicated in FIG. 5, only a single data insertion device DSE inserted in the multiplex line c is respectively provided instead of the multiplexer/demultiplexer Muldex and/or the digital switching center OVSt, the data insertion device DSE coupling the bit stream flowing from or, respectively, to the subscriber station A or, respectively, the switching center NVSt into or out of the bit stream of the multiplex line c. By so doing, an even greater decoupling is provided between the public network (in the example) and the branch exchange. Such data insertion devices can be formed, for example, by digital signal insertion devices as are known from telecom report 2 (1979), special issue "Digital Transmission" pp. 46-51, FIGS. 4 and 5, and are commercially available under the designation DSE 64K/2.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:
1. A digital communication system comprising:
    means defining a plurality of 64 kbit/s channels each of which includes a 56 kbit/s primary channel and an 8 kbit/s auxiliary channel;
    a plurality of subscriber stations and a switching center interconnected via said channels;
    means for selectively operating the primary channels to carry pulse code modulated or $\Delta$modulated speech signals, rapid fixed image signals and rapid data signals from subscriber-to-subscriber;
    means for selectively operating the auxiliary channels to carry information signals including exchange-oriented switching signals, slow data transmission signals, slow fixed image signals and subscriber-to-subscriber control signals, and special service indication signals including remote control signals; and
    means in said switching center operated to constantly read said auxiliary channels and selectively insert into and extract from said auxiliary channels the information signals in accordance with the special service indication signals read from said auxiliary channels.

* * * * *